United States Patent [19]

Pourfarzaneh

[11] Patent Number: 6,103,127
[45] Date of Patent: Aug. 15, 2000

[54] METHODS FOR REMOVING HAZARDOUS ORGANIC MOLECULES FROM LIQUID WASTE

[75] Inventor: Matt Pourfarzaneh, Alameda, Calif.

[73] Assignee: Cortex Biochem, Inc., San Leandro, Calif.

[21] Appl. No.: 09/030,537

[22] Filed: Feb. 23, 1998

Related U.S. Application Data

[63] Continuation-in-part of application No. 08/657,748, May 31, 1996, Pat. No. 5,790,964, which is a continuation-in-part of application No. 08/255,229, Jun. 7, 1994, Pat. No. 5,564,104, which is a continuation-in-part of application No. 08/073,039, Jun. 8, 1993, abandoned.

[51] Int. Cl.⁷ .................................................. B01D 15/00
[52] U.S. Cl. ........................................... 210/690; 210/695
[58] Field of Search ...................... 588/20; 252/62.54, 252/62.56; 210/690, 695

[56] References Cited

U.S. PATENT DOCUMENTS

| | | | |
|---|---|---|---|
| 2,752,309 | 6/1956 | Emmons et al. | 210/24 |
| 3,791,930 | 2/1974 | Saxholm | 195/103.5 |
| 3,843,450 | 10/1974 | Saxholm | 195/99 |
| 3,902,849 | 9/1975 | Barak et al. | 23/252 |
| 3,981,776 | 9/1976 | Saxholm | 195/103.5 |
| 3,985,608 | 10/1976 | Saxholm | 195/127 |
| 4,020,003 | 4/1977 | Steinberg et al. | 252/301.1 |
| 4,033,868 | 7/1977 | Meichsner et al. | 210/38 |
| 4,101,026 | 7/1978 | Bonk | 206/205 |
| 4,104,026 | 8/1978 | Brooker et al. | 23/230 |
| 4,140,582 | 2/1979 | Saxholm | 195/127 |
| 4,142,020 | 2/1979 | Okamura et al. | 428/403 |
| 4,213,825 | 7/1980 | Saxholm | 435/291 |
| 4,324,859 | 4/1982 | Saxholm | 435/33 |
| 4,371,624 | 2/1983 | Saxholm | 435/291 |
| 4,430,226 | 2/1984 | Hedge et al. | 210/638 |
| 4,452,773 | 6/1984 | Molday . | |
| 4,496,664 | 1/1985 | Motojima | 502/402 |
| 4,642,203 | 2/1987 | Matsunaga et al. | 252/631 |
| 4,643,981 | 2/1987 | Card | 436/500 |
| 4,645,625 | 2/1987 | Lundstrom | 252/631 |
| 4,657,868 | 4/1987 | Saxholm | 435/287 |
| 4,659,512 | 4/1987 | Macedo et al. | 252/629 |
| 4,687,581 | 8/1987 | Macedo et al. | 210/670 |
| 4,695,392 | 9/1987 | Whitehead et al. | 252/62.54 |
| 4,780,239 | 10/1988 | Snyder et al. | 252/184 |
| 4,800,042 | 1/1989 | Kurumada et al. | 252/628 |
| 4,832,850 | 5/1989 | Cais et al. | 210/638 |
| 4,853,130 | 8/1989 | D'Angelo et al. | 210/663 |
| 4,863,637 | 9/1989 | Matsumoto et al. | 252/628 |
| 4,876,036 | 10/1989 | Candau et al. | 252/637 |
| 4,879,006 | 11/1989 | Turner | 204/1.5 |
| 4,902,665 | 2/1990 | Elfline | 502/402 |
| 4,992,377 | 2/1991 | Saxholm | 435/299 |
| 4,995,984 | 2/1991 | Barkatt | 210/670 |
| 5,024,767 | 6/1991 | Kubo et al. | 210/682 |
| 5,096,624 | 3/1992 | Dorr et al. | 252/631 |
| 5,122,268 | 6/1992 | Burak et al. | 210/202 |
| 5,244,580 | 9/1993 | Li | 210/666 |
| 5,385,707 | 1/1995 | Miltenyi et al. | 422/69 |
| 5,468,456 | 11/1995 | Nunez et al. . | |
| 5,855,790 | 1/1999 | Bradbury et al. | 210/676 |
| 5,900,146 | 5/1999 | Ballard et al. | 210/222 |

FOREIGN PATENT DOCUMENTS

| | | |
|---|---|---|
| 304143 | 2/1989 | European Pat. Off. . |
| 152479 | 12/1981 | Germany . |
| 238728 | 9/1986 | Germany . |
| 53-032870 | 3/1978 | Japan . |
| 2035990 | 2/1990 | Japan . |
| 2095496 | 4/1990 | Japan . |
| 8168775 | 7/1996 | Japan . |
| 96/4052 | 12/1996 | WIPO . |

OTHER PUBLICATIONS

Al–Dujaili, E.A.S., et al., "Development and Application of an Automated Direct Radioimmunoassay for Plasma Aldosterone", *Journal of Endocrinology*, 81:111 (1979).

Hancock, A.A., "A Rapid, Economical Technique for Removing Radioactivity from Receptor Binding Assay Aqueous Wastes", *Health Physics*, 47:640–641 (1984).

Nargessi, R.D., et al., "Solid–Phase Fluoroimmunoassay of Human Albumin in Biological Fluids", *Clinica Chimica Acta*, 89:455–460 (1978).

Pourfarzaneh, M. et al., "The Use of Magnetizable Particles in Solid Phase Immunoassay", *Methods of Biochemical Analysis*, 28:267–295 (1982).

Pourfarzaneh, M. et al., "Cortisol Directly Determined in Serum by Fluoroimmunoassay with Magnetizable Solid Phase", *Clinical Chemistry*, 26:730–733 (1980).

Ratcliff, J.G., "Separation Techniques in Saturation Analysis", *Br. Med. Bull.*, 30:32–37 (1974).

Yalow, R.S., "Protein and Polypeptide Hormones", *Exc. Med. Found. Int. Congr. Ser.*, 161:627–631 (1968).

Coulter–Mackie, Marion B., "A Method for Removal of Radioactive Nucleotides from Electrophoretic Buffers", *Circle Reader Service* No. 160, vol. 16, No. 6 (1994).

*Primary Examiner*—Ngoclan Mai
*Attorney, Agent, or Firm*—Townsend & Townsend & Crew

[57] ABSTRACT

The present invention relates to methods for processing liquid waste solutions containing organic molecules such as organic chemical molecules and biological agents or materials. More specifically, the invention relates to the use of solid phase binders for the removal of organic molecules from liquid waste solutions.

7 Claims, 2 Drawing Sheets

METHODS FOR REMOVING HAZARDOUS ORGANIC MOLECULES FROM LIQUID WASTE

RELATED APPLICATIONS

This application is a continuation-in-part of U.S. patent application Ser. No. 08/657,748, filed May 31, 1996, now U.S. Pat. No. 5,790,964, which is a continuation-in-part of U.S. patent application Ser. No. 08/255,229, filed Jun. 7, 1994, now U.S. Pat. No. 5,564,104, which is a continuation-in-part of U.S. patent application Ser. No. 08/073,039, filed Jun. 8, 1993, now abandoned the disclosures of which are hereby incorporated by reference in their entirety.

FIELD OF THE INVENTION

This invention relates to the processing of waste solution containing organic chemicals, biohazardous agents, and other hazardous or environmentally undesirable agents, and to the removal of such agents from liquid waste solutions. More specifically, this invention relates to the use of solid phase binders to remove organic chemicals, biohazardous agents, and other hazardous or environmentally undesirable agents from liquid waste solutions.

BACKGROUND OF THE INVENTION

There is widespread release of hazardous and environmentally disadvantageous organic chemicals and biohazardous agents into the natures water supplies. For examples, contamination of underground water with methyl tertiary butyl ether (MTBE) resulting from the leakage of gasoline storage tanks has resulted in the urgent need for effective and economical separation and removal of this carcinogenic agent from water reservoirs and other water streams. Important examples of other hazardous or environmentally disadvantageous organic chemicals and biohazardous agents include pesticides used in agriculture. Pesticides also end up in water reservoirs and water streams through water run off in the process of irrigation. Hazardous chemicals produced in chemical plants, or toxic byproducts produced during processes of refining oil, are among other examples of liquid waste including hazardous chemicals. Most of the hazardous chemicals generated in oil refineries, for instance, are stored on site; some are released with the non-hazardous waste either inadvertently, or due to the lack of regulations, perhaps in the absence of effective, efficient and economically viable separation/removal techniques. These toxic chemical contaminants are usually found in aqueous or organic solutions in relatively low, but nevertheless hazardous concentration. By removing these low concentration contaminants, the solution then can be released into the waste stream safely, or recycled.

Biohazardous agents, such as viruses and bacterial contaminated solutions are sometimes released into the sewage systems by hospitals, research laboratories, and biotechnology organizations. Although most of these contaminants are destroyed as a result of being exposed to a relatively harsh environment in the sewage treatment system. However, many viruses and bacterium will survive the sewage treatment cycle and can pose a real health threat. Hepatitis virus and *Escherichia coli* bacteria for instance are among such biohazardous agents. It is therefore advantageous to develop methods to remove biohazardous agents from liquid contaminated waste solutions. Following the removal process, the decontaminated liquids are rendered non-hazardous and can then be discarded as regular non-hazardous waste.

It must be noted that the disposal or storage of large volumes of low level liquid hazardous chemicals or biohazardous agents is particularly expensive and difficult without first concentrating and extracting these agents from the liquid waste stream. There is a demonstrated need for effective and comparatively inexpensive methods to remove these hazardous chemicals or biohazardous agents in concentrated form from liquid waste solutions. When this is accomplished, the concentrated hazardous chemicals or biohazardous agents can more easily be destroyed rendering the remaining waste non-hazardous. The expense associated with the disposal of concentrated liquid hazardous waste removed from the liquid waste stream is markedly decreased.

SUMMARY OF THE INVENTION

As a first aspect, the present invention provides a method for removing hazardous organic molecules from a liquid waste solution. The method comprises the steps of: a) contacting the liquid waste solution with a solid phase binder comprising an adsorbent particle attached to or entrapped in a matrix to form a solid phase binder:organic molecule complex; and b) separating the complex from the liquid waste solution to remove the organic molecules from the liquid waste solution.

As a second aspect, the present invention provides a second method for removing hazardous organic molecules from a liquid waste solution. The method comprises the steps of: a) contacting the liquid waste solution with a solid phase binder comprising a magnetizable particle binder to form a magnetizable particle binder:organic molecule complex; and b) separating the complex from the liquid waste solution to remove the organic molecules from the liquid waste solution.

As a third aspect, the present invention provides a third method for removing hazardous organic molecules from a liquid waste solution. The method comprises the steps of: a) contacting the liquid waste solution with a solid phase binder comprising an immunochemical binder to form an immunochemical binder:organic molecules complex; and b) separating the complex from the liquid waste solution to remove the organic molecules from the liquid waste solution.

As a fourth aspect, the present invention provides another method for removing hazardous organic molecules from a liquid waste solution. The method comprises the steps of: a) contacting the liquid waste solution with a solid phase binder comprising a natural protein conjugate binder, to form a natural protein conjugate binder:organic molecule complex; and b) separating the complex from the liquid waste solution to remove the organic molecules from the liquid waste solution.

As a fifth aspect, the present invention provides another method for removing hazardous organic molecules from a liquid waste solution. The method comprises the steps of: a) contacting the liquid waste solution with a solid phase binder comprising a targeted peptide binder to form a peptide binder:organic molecules complex; and b) separating the complex from the liquid waste solution to remove the organic molecules from the liquid waste solution.

As a sixth aspect, the present invention provides another method for removing hazardous organic molecules from a liquid waste solution. The method comprises the steps of: a) contacting the liquid waste solution with a solid phase binder comprising a synthetic oligonucleotide binder to form a binder:organic molecule complex; and b) separating the complex from the liquid waste solution to remove the organic molecules from the liquid waste solution.

These and other aspects of the present invention are described in further detail in the detailed description of the preferred embodiments of the invention, and the examples which follow.

DETAILED DESCRIPTION OF THE PREFERRED EMBODIMENT

The invention relates generally to the removal and/or concentration of liquid waste solutions containing organic molecules. The removal of hazardous organic molecules from the liquid waste solution facilitates the efficient and economical disposal of the liquid waste. The hazardous organic molecules are removed through the use of a solid phase binder which, upon contact with the hazardous organic molecules in the liquid waste solution, forms a complex of the binder and organic molecule which can then be conveniently removed from the remainder of the liquid waste solution. The liquid waste solution having had the hazardous organic molecules removed therefrom, can then be advantageously disposed as non-hazardous waste.

The terms employed herein have there common meaning in the art unless otherwise indicated. For clarity, the following terms have the meanings ascribed to them.

The term "organic molecule" or "hazardous organic molecule" refers to toxic or environmentally undesirable or unfavorable organic molecules. In particular the organic molecules can be organic chemicals or biological agents. The term "organic molecule" as used herein excludes radioactive labeled molecules.

The term "organic chemical" refers to carbon-based chemicals, including small organic molecules and macromolecules, as well as derivatives and analogues thereof. Examples of organic chemicals which can be removed from a liquid waste solution using the methods of the present invention include but are not limited to medicinal chemicals such as pharmaceuticals and antibiotics; petroleum-based or petroleum-derived chemicals and synthetic petro-chemical additives such as MTBE, atrazines, alar, carbofuran, heptachlor, sulfomethazine, toxins, pesticides, herbicides, and fungicides. The organic chemicals referred to herein do not include elemental or ionic metals.

The term "biological agents (materials)" refers to carbon-based molecules, including macromolecules, that are found in a biological source, as well as derivatives and analogues thereof. Examples of biological agents which can be removed from liquid waste solutions using the methods of the present invention include but are not limited to viral agents, bacterial agents and endotoxins, as well as molecules such as nucleic acids and peptides which are found in nature, genetically cloned, or synthesized in the laboratory or produced in cell culture. For example, viral and bacterial agents include all types and sub-types of hepatitis virus (hepatitis A, B, C, D, and E) *Escherichia coli,* (including 0–157) bacteria lime disease, *Giardia lambia* and *cryptosporidium parvum.* Nucleic acid and amino acid analogues containing modified bases not found in nature are included as biological agents as well. The biological agents may be of the type which can be isolated from nature or synthesized in the laboratory, such as synthetic peptides or oligonucleotides.

The term "entrapped" with reference to a particle in a polymer or matrix refers to particles embedded in, encapsulated in, or otherwise incorporated in a polymer or matrix.

The term "hazardous" as used to describe molecules or agents refers to molecules or agents which have been denoted by the Food and Drug Administration, the Department of Health and Safety, the Environmental Protection Agency or any other governmental regulatory agency as hazardous. The term, also refers to molecules and agents which are environmentally undesirable or unfavorable, but which have not been denoted by a government agency as posing a threat to the environment or human health.

The term "liquid waste solution" refers to liquid waste streams or lagoons which contain any of the organic molecules described above. Liquid waste solutions may be aqueous-based or non-aqueous-based liquids. The liquids may be true solutions, wherein the organic molecules to be removed are dissolved in the liquid waste solution, as well as dispersions, suspensions, and emulsions. All of the foregoing types of liquid wastes may be treated using the methods of the present invention.

The methods of the present invention relate to the removal of these organic molecules from the larger volume of liquid waste. In general, the methods involve contacting the liquid waste solution with a solid phase binder to form binder:organic molecule complex, and separating the complex from the liquid waste solution to thereby remove the organic molecules from the liquid waste solution. Because the binders are solid phase binders, the formed complex can typically be conveniently removed from the liquid waste solution. The removal of the organic molecules from the liquid waste solution in this manner concentrates the organic molecule waste and thereby reduces the volume of hazardous material in the liquid waste solution.

The methods described herein are useful for the treatment or clarification of a number of different types of liquid waste solutions. For example, the methods of the present invention are useful for removing organic molecules from a liquid waste solution containing only one type of hazardous organic molecules. In addition, the methods of the present invention may be employed for the purpose of treating liquid waste solutions containing more than one and even many different types of hazardous organic molecules. In other words, the waste treatment methods described herein may be used to remove different types of organic molecules, such as combinations of both organic chemical molecules and biological agents from a single liquid waste solution. Because the methods of the present invention are capable of removing many different types of organic molecules from a waste solution in a single step, the methods of the present invention provide distinct advantages over conventional methods which often require treating a waste solution with different reagents in a multi-step process to remove all hazardous organic molecules.

Many different varieties of solid phase binders can be employed in the methods of the present invention to enable the efficient and economical treatment of many types of liquid waste solutions. The term "solid phase binder" as used herein refers to any solid phase preparation that is capable of binding a hazardous molecule present in a liquid solution.

For example, solid phase binders may be used that are based on known methods for separating bound from free radiolabeled molecules in radioimmunoassay procedures. A number of such separation methods are listed in Table 1 below.

TABLE 1

| | Separation Methods | |
|---|---|---|
| Support | Activation | Assay |
| Polystyrene | Diazotisation | HGH |
| p-aminobenzyl cellulose | Diazotisation | HGH |
| Polytetrafluoroethylene/styrene | $CSCL_2$ | HGH |
| Sephadex G25 | CNBr | HCG |
| Sephadex G25 | CNBr | HCG |
| Cellulose | CNBr | HCG, LH |
| Cellulose | CNBr | Oxytocin |
| Copolymer of dextran (Sephadex G200) | CNI | Insulin |
| Enzacryl AA | Diazotisation | Oestrogens, e.g., oestradiol, oestrone |
| Sephadex G25 | CNBr | Steroid hormones, e.g., progesteron and oestradiol |
| Sepharose 4B | CNBr | Steroid and protein hormones |
| Controlled-pores glass | Isothiocyanate | Digoxin |
| Cellulose | CNBr | Steroid and protein hormones |
| Agarose | CNBr | Digoxin |
| Sepharose 4B | CNBr | HPL |
| Sepharose 6B | CNBr | HPL |
| Sephadex G25 | CNBr | HPL |
| Cellulose | CNBr | HPL |
| p-aminobenzenetrimethoxysilane | Diazotisation | Digoxin |
| Enzacryl FEO-M | Diazotisation | $T_4$, Digoxin, HPL |

TABLE 2

Magnetizable Solid-Phase Supports Carrying a Specific Antibody or Binding Proteins Covalently Attached Within the Matrix, Which Participate in the Initial Binding Reaction

| Polymer | Magnetizable Component | Activation Method | Reagent Coupled | Application |
|---|---|---|---|---|
| — | $Fe_3O_4$* | m-diaminobenzene/diazotisation | assorted antisera | RIA |
| — | $Ni^+$ | m-diaminobenzene/diazotisation | assorted antisera | RIA |
| — | $Fe_3O_4$ | p-diaminobenzene-trimethoxy-silane/diazotisation | anti-digoxin | RIA |
| | | 3-aminopropyltri-methoxy-silane/glutaraldehyde | assorted antisera | RIA |
| a-cellulose | $Fe_3O_4$ | cyanogen bromide | assorted antisera | RIA |
| | | | anti-digoxin | RIA |
| | | | assorted antisera | RIA |
| | | | anti-methotraxate | RIA |
| | | | anti-aldosterone | RIA |
| | | | anti-$T_4$ | FIA+ |
| | | | anti-cortinol | FIA+ |
| a-cellulose | $Fe_3O_4$ | cyanogen bromide | chicken serum | Radioassay |
| m-aminobenzyl-oxymethyl-cellulose | $Fe_3O_4$ | diazotisation | assorted antisera | RIA |
| polyacrylamide | $Fe_3O_4$ | glutaraldehyde | assorted antisera | RIA |

TABLE 2-continued

Magnetizable Solid-Phase Supports Carrying a Specific Antibody or Binding Proteins
Covalently Attached Within the Matrix, Which Participate in the Initial Binding Reaction

| Polymer | Magnetizable Component | Activation Method | Reagent Coupled | Application |
| --- | --- | --- | --- | --- |
| polyaerolein | $Fe_3O_4$ | autoreactive | anti-$T_4$ | RIA |
|  |  |  | anti-HSA | FIA[+] |
|  |  |  | anti-IgG | FIA[+] |
| agarose | $Fe_3O_4$ | cyanogen bromide | assorted antisera | RIA |
| bovine serum albumin | $BaFe_{12}O_9$ | — | sockage salmon serum (incorporated into matrix) | RIA |

*Enzacryl FEO-M, Koch-Light Ltd.
**Enzacryl NIK
[+]Fluoroimmunoassay

TABLE 3

Magnetizable Separation Agents Added After Completion of the Initial Binding Reaction to Achieve Separation of Free and Bound Fractions

| Polymer | Magnetizable Component | Binding Agent | Application |
| --- | --- | --- | --- |
| — | $Fe_3O_4$* | second AB** (anti-rabbit IgG) | RIA |
| α-cellulose | $Fe_3O_4$ | second AB** (anti-rabbit IgG) | RIA |
| polyacrylamide | $Fe_3O_4$ | charcoal+ | RIA |
| polyacrylamide | $Fe_3O_4$ | charcoal+ | RIA |
| bovine serum albumin (polymerized) | $BAFe_{12}O_9$ | charcoal+ | RIA |
| bovine serum albumin (polymerized) | $BAFe_{12}O_9$ | ion-exchange resin+ | RIA |
| bovine serum albumin (polymerized) | $BAFe_{12}O_9$ | albumin matrix | RIA |

*Enzacryl, Koch-Light Ltd.
**Co-valently linked to surface
+entrapped within particle matrix Additional separation methods for radioimmunoassay procedures which describe additional materials for use as solid phase binders are described in the literature. A variety of solid material may be used as solid supports in solid phase binders. Examples of such solid materials include many types of plastics, nylon, polyacrylamide, polyacrolein, polystyrene, polypropylene, cellulose, agarose, celite, other polymers, copolymers of any of the foregoing polymers, glass, porous glass, other naturally occurring resins, and combinations of two or more of the foregoing.

A. Types of Solid Phase Binders

1. Entrapped/Attached Adsorbent Particle Binders

In one embodiment, the solid phase binder employed in the methods of the present invention includes an adsorbent particle or particles attached to or entrapped in a matrix (including a polymer matrix). For example the adsorbent particle or particles may be incorporated into a matrix (including a polymer matrix). As another example, the adsorbent particle or particles may be attached to a porous glass support such as a porous glass bead. Any of the solid phase materials described herein above may be used for the attachment or entrapment of the adsorbent particle.

The term "adsorbent particle(s)" or "solid phase adsorbent(s)" refers to a particular type of solid phase binder that binds organic molecules by the process of adsorption of the organic molecule by the adsorbent particle(s). As used herein, the term "particle(s)" refers to a solid unit of adsorbent material in any size or shape, including pellets, granules, tablets, spheres, and the like. A wide variety of different adsorbent particles may be used in the solid phase binders of the present invention. Example of a adsorbent particles which may be employed in the methods of the present invention include but are not limited to silicates, talc, Fuller's earth, glass wool, charcoal, activated charcoal, celite, and combinations of two or more of the foregoing. For example, a mixture of celite and charcoal may be used as the adsorbent particles in the solid phase binders of the present invention.

Charcoal adsorbents (i.e., any solid phase adsorbent containing charcoal) are one preferred type of adsorbent particle for use in the methods of the present invention. The charcoal adsorbent particles can be particles of treated or untreated charcoal. Alternatively, the charcoal adsorbent can be particles of charcoal that are attached to a variety of different solid supports including the polymers and matrices described above.

The solid phase binders comprising an adsorbent particle attached to or entrapped in a matrix can be prepared using conventional techniques known to those skilled in the art. For example, charcoal may be entrapped in a polymer by adding charcoal to acrylamide during the production of polyacrylamide gel. Methods for attaching adsorbent particles to polymers or matrices such as glass beads are also known in the art.

For convenience, adsorbents entrapped in or chemically bound to a matrix may be packed in a column or packages as a cartridge or any other resin containment device, holder, or container. The use of solid phase binders packed into a column is described more fully below.

When contacted with the organic molecules contained in the liquid waste solution to be treated according to the methods of the present invention, the adsorbent particles entrapped in or attached to the matrix, form a complex with the organic molecule. The term "solid phase binder:organic molecule complex" as used herein refers to the complex which is formed between the solid phase binder (in this case the adsorbent particle entrapped in or attached to the matrix) and the organic molecules which are to be removed from the liquid waste solution. The solid phase binder binds to the organic molecules in the liquid waste solution, thereby facilitating the physical separation of the organic molecules from the bulk of the liquid waste solution. The type of binding in the complex varies depending on the type of solid phase binder that is used and the nature of the organic molecules in the liquid waste solution.

2. Magnetizable Particle Binders

Magnetizable particle binders are another type of solid phase binders which may be employed in the methods of the present invention to remove organic molecules from a liquid waste solution. The term "magnetizable particle binder" as used herein refers to a solid unit of adsorbent material in any size and shape, including pellets, granules, tablets, spheres, and the like, which uses magnetizable material, imbedded, encapsuled, or otherwise incorporated within the particle binder, rendering the particle binder reactive to a magnetic field. There can be a variety of different types of magnetizable materials. These materials can use different magnetizable constituents as well as different matrices to form the solid phase particle. There are a variety of different magnetizable constituents that can be used in the particle. Typically, the magnetic constituents are not magnetized metals, but rather metallic constituents that can be attracted, or otherwise be reactive by the use of a magnetic field. However, particles with magnetic properties can also be used. Typical examples of magnetizable constituents include but are not limited to those referred to in Tables 2 and 3, including ferric oxide, nickel oxide, barium ferrite, and ferrous oxide. The magnetizable constituents are entrapped in or attached to a matrix. The matrix may be glass or a polymer matrix comprised of polyacrylamide, polyacrolein, cellulose, agarose, latex, nylon, polystyrene, and copolymers thereof.

Another variety of magnetizable particle binder includes an adsorbent particle(s), such as those described above entrapped within a magnetizable polymer. The term "magnetizable polymer," as used herein refers to a polymer containing a magnetizable constituent. Polyacrylamide, polyacrolein, cellulose polymers, lagex agarose, nylon, polystyrene and copolymers thereof, which have incorporated iron oxide particles are examples of magnetizable polymers. A variety of magnetizable particle binders, their use and methods of their preparation are described in M. Pourfarzaneh, et al., *Methods of Biochemical Analysis* 28: 267 (1982).

Magnetizable particle binders can use any of the binding principles used for other solid phase binders. For example, magnetizable particle binders can have adsorbent particles attached to or incorporated into a magnetizable particle or polymer. These particles can bind organic molecules by the process of adsorption.

Magnetizable particle solid phase binders can be prepared using methods known to those of skill in the art. For example, magnetizable polymers can be prepared as described in M. Pourfarzaneh (1980) "Synthesis of Magnetizable Solid Phase Supports for Antibodies and Antigens and Their Application to Isotopic and Non-isotopic Immunoassay," Medical College of St. Bartholomew's Hospital, University of London, London, UK and in M. Pourfarzaneh et al. (1982) supra. For example, iron oxide can be incorporated into a polyacrylamide or polyacrolein gel during the polymerization reaction as described in M. Pourfarzaneh (1980) supra. As another example, charcoal particles entrapped in a magnetizable polymer matrix can be prepared as described in M. Pourfarzaneh (1980) supra and M. Pourfarzaneh et al. (1982) supra. A variety of other magnetizable polymers can also be prepared by similar methods or by other methods know to those of skill in the art.

When contacted with the organic molecules contained in the liquid waste solution to be treated according to the methods of the present invention, the magnetizable particle binder forms a physical adsorption or biological reaction complex with the organic molecule. The term "magnetizable particle binder:organic molecule complex" as used herein refers to the complex which is formed between the magnetizable particle binder and the organic molecules which are to be removed from the liquid waste solution. The magnetizable particle binder binds to the organic molecules in the liquid waste solution. The particular type of binding in the complex varies depending on the type of magnetizable particle employed and the nature of the organic molecules in the liquid waste solution.

3. Immunochemical Binders

Some organic molecules cannot be readily adsorbed to the solid phase adsorbents described above. These types of molecules can generally be removed from liquid waste solutions by use of solid phase immunochemical binders. The term "immunochemical binder" as used herein, refers to those solid phase binders that use antibody-antigen binding to accomplish the binding of an organic molecule to a solid phase binder. The term also includes the binding of antibodies in liquid waste solutions by non-immunoglobulin proteins such as protein A, protein G, combined protein A-protein G molecules (protein A/G). Immunochemical binders generally include an antibody, plantibody, natural or synthetic binder, or a genetically engineered antibodies or binders specific for a hazardous compound bound or coupled to a solid support such as the matrices (including polymer matrices) or magnetizable polymers or particles described herein above.

The term "antibody" as used herein refers to an immunoglobulin molecule capable of binding to a specific epitope on an antigen. Antibodies can be a polyclonal mixture or monoclonal. Antibodies can be intact immunoglobulins derived from natural sources or from recombinant sources and can be immunoreactive portions of intact immunoglobulins. Antibodies are typically immunoglobulin polypeptide chains. The antibodies may exist in a variety of forms including for example, Fv, $F_{ab}$, and $F(ab)_2$, as well as in single chains (See, e.g., Huston, et al., *Proc. Nat. Acad. Sci. U.S.A.* 85: 5879 (1988) and Bird, et al., *Science* 242: 423 (1988), the disclosures of which are incorporated herein by reference in their entirety). See generally, Hood, et al., IMMUNOLOGY, Benjamin, N.Y., 2nd ed. (1984), and Hunkapiller and Hood, *Nature* 323: 15 (1986), the disclosures of which are incorporated herein by reference in their entirety.

The term "plantibody" as used herein refers to an immunoglobulin molecule, derived from a plant, which is capable of binding to a specific epitope of an antigen. Generally, plantibodies are recombinant proteins including antibodies, which are expressed in plants. Plantibodies are known in the art, as described in Institut für Biologie I, *Antibody Engineering Group*, Rheinisch-Westfalische Technische Hochschule Aachen (1997).

Genetically engineered antibodies may also be employed in the immunochemical binders of the present invention. An examples of genetically engineered antibodies include genetically engineered chimeric monoclonal antibodies in which the hypervariable region of a mouse monoclonal antibody, which contains the antigen recognition site, is incorporated into a human immunoglobulin. See, Colcher et al., *Cancer Research* 49: 1738 (1989). Conventional techniques for producing genetically engineered antibodies can also be employed to produce antibody fragments. See, Morrison and Oi, *Adv. Immunol.* 44: 65 (1990) and Rodwell, *Nature* 342: 99 (1989). These genetically engineered antibody fragments may also be employed in the immunochemical binders of the present invention.

The immunochemical binders can also comprise an antibody and a adsorbent particle attached to or entrapped in a matrix (including a polymer matrix). Typically, a solid phase immunochemical binder has an antibody capable of binding an organic molecule coupled to a solid phase in the liquid waste solution. The antibody may be a naturally occurring or synthetically produced binder, or a plantibody, or a genetically engineered binder specific for a particular organic molecule. The immunochemical binders can also comprise an antibody attached to a magnetizable polymer particle such as the magnetizable polymers described above. Solid phase immunochemical binders wherein the solid phase is as magnetizable particle are referred to in particular as "magnetizable particle immunochemical binders".

Alternatively, an antigen can be coupled to a solid phase and used to bind antibodies that are present in the liquid waste solution. As yet another example, antibodies that bind organic molecules can be added to a liquid waste solution in a liquid phase to form an immunocomplex with the organic molecule. The immunocomplex can be bound by a solid phase reagent capable of binding the liquid phase antibody. Examples of such solid phase reagents include anti-immunoglobulin antibodies, protein A, protein G, or protein A/G coupled to a solid phase adsorbent particle.

Methods of preparing solid phase immunochemical binders are well known to those of skill in the art. For example, antibodies can be attached to various solid phases by methods used for constructing immunoassay solid supports. See, ENZYME IMMUNOASSAY, E. T. Maggio, ed., CRC Press, Boca Raton, Florida (1980); "Practice and Theory of Enzyme Immunoassays," P. Tijssen, LABORATORY TECHNIQUES IN BIOCHEMISTRY AND MOLECULAR BIOLOGY, Elsevier Science Publishers B. V. Amsterdam (1985); and Harlow and Lane, ANTIBODIES: A LABORATORY MANUAL, Cold Spring Harbor Pubs., N.Y. (1988), each of which is incorporated herein by reference in their entirety.

Immunochemical binders including magnetizable particle immunochemical binders can be prepared as described in M. Pourfarzaneh, et al., (1980) supra and M. Pourfarzaneh, et al., (1982) supra. Antibodies and other proteins and peptides of interest can be coupled to a variety of magnetizable polymer solid supports using methods known in the art. For example, antibodies and other proteins can be coupled to CNBr-activated magnetizable cellulose and to glutaraldehyde activated magnetizable polyacrylamide using standard procedures. See, M. Pourfarzaneh, et al., (1980) supra. In addition, polymers such as polyacrolein have highly reactive aldehyde groups on their surface which can be coupled to primary amino groups of proteins. See, M. Pourfarzaneh, et al., (1980) supra. A number of other polymer and protein chemistry reactions known to those of skill in the art can also be used to couple antibodies and other proteins to the magnetizable polymers to produce the solid phase binders of the present invention.

As in the case of the adsorbent particle binders and the magnetizable particle binders discussed above, the immunochemical binders form a complex with the organic molecules contained in the liquid waste solution when the binders are contacted with the liquid waste solution. The term "immunochemical binder:organic molecule complex" as used herein refers to the complex which is formed between the immunochemical binder and the organic molecules which are to be removed from the liquid waste solution. Typically, the immunochemical binder binds to the organic molecules in the liquid waste solution by antigen-antibody binding in the formation of the complex.

4. Natural Protein Conjugate Binder

Another example of solid phase binders which may be employed in the methods of the present invention includes natural protein conjugate binders. Natural protein conjugate binders generally comprise a natural protein such as polymyxin (i.e., polymyxin A, B, C, D, E, F, K, M, P, S, or T) or a mixture of polymyxins attached to a solid phase adsorbent particles or solid phase magnetizable polymer particles. Another natural protein for natural protein conjugate binders is thyroxin binding globulin [TBG] which is a natural carrier binder for thyroxin hormone. This natural carrier protein binder is also capable of binding to furosemide, a carcinogenic and tertatogenic agent and 8-analino-1-naphthalene sulfonic acid, a known carcinogenic agent. The solid phase adsorbent particles or solid phase magnetizable polymer particles can be any of those described above.

The polymyxins which may be conjugated to the solid phase particles are antibiotic complexes produced by *Bacillus polymyxa*. See, Brownlee, *Biochem. J* 43: XXV (1948). Methods for conjugating or attaching these natural proteins to a solid support are known in the art and conjugates of polymyxins on other types of common solid supports are commercially available. For example, the AFFI-PREP® polymyxin support is available from Bio-Rad Laboratories. Polymyxin conjugate solid phase binders are particularly useful for removing endotoxins from liquid waste solutions. Endotoxins are pyrogenic lipopolysaccharides of gram-negative bacteria which are common contaminants of aqueous and physiological solutions.

The natural protein conjugate binders form a complex with the organic molecules contained in the liquid waste solution when the binders are contacted with the liquid waste solution. The term "natural protein conjugate binder:organic molecule complex" as used herein refers to the complex which is formed between the natural protein conjugate binder and the organic molecules which are to be removed from the liquid waste solution. Typically, the natural protein conjugate binder binds to the organic molecules in the liquid waste solution by mechanisms similar to antigen-antibody binding in the formation of the complex.

5. Targeted Peptide Binders

Yet another type of solid phase binder which may be employed in the methods of the present invention is a targeted peptide binders. Targeted peptide binders typically comprise a peptide attached to a solid phase adsorbent particle or a solid phase magnetizable polymer particle such as those described herein above. The peptide attached to the solid phase particle binds to a specific organic molecule, and is thus "targeted" toward the removal of that organic molecule from the liquid waste solution. The particular organic molecule which binds to a given targeted peptide binder will depend upon the peptide employed. When the organic molecule(s) to be removed from the liquid waste solution is known, a peptide binder can be designed with a peptide which will specifically and tightly bind that organic molecule(s). An example of a targeted peptide binder is hepatitis B surface antigen fragments known as Tre-S1[12-32] or Tre-S2[1-32] or Tre-S2[1-26], which can be synthesized and attached to solid phase particles, and used as a binder to extract antibodies to hepatitis B surface antigen. Similarly peptides can be synthesized for hepatitis C and hepatitis A virus and other infectious agents. The peptide binders may be prepared using the general techniques known in the art for attaching a peptide to a solid support. Examples of such techniques include conventional peptide synthesizers 6. Oligonucleotide Binders Another category of solid phase binders are oligonucleotide binders. Oligonucleotide binders include synthetic oligonucleotide binders and targeted oligonucleotide binders. Generally, oligonucleotide binders including an oligonucleotide attached to a to a solid phase adsorbent particle or a solid phase magnetizable polymer particle such as those described herein above.

In the case of synthetic oligonucleotide binders, the oligonucleotide attached to the solid phase particle is a synthetic oligonucleotide which may or may not be targeted toward a specific organic molecule. For example, a synthetic oligonucleotide binder including a synthetic oligonucleotide which binds to multiple nucleotide molecules. Typically, the synthetic oligonucleotide binders are specific to one or a few particular organic molecules. Many different synthetic oligonucleotides are known in the art, and any such synthetic oligonucleotides may be attached to the solid phase adsorbent particles or solid phase magnetizable polymer particles to produce the oligonucleotide binders.

As an example, oligodeoxythymidylic acid (oligo dt) is one synthetic oligonucleotide which may be attached to any of the solid phase adsorbent particles or solid phase magnetic polymer particles discussed above. Synthetic oligonucleotide binders comprising oligo dt are useful for removing, for example, hepatitis viruses from liquid waste solutions. One such example is published by M. S. Elwood, et al., *Clin. Chem.* 32(9): 1631–1636 (1986).

In the case of targeted oligonucleotide binders, the oligonucleotide attached to the solid phase particle binds to a specific organic molecule, and is thus "targeted" toward the removal of that organic molecule from the liquid waste solution. The particular organic molecule which binds to a given targeted oligonucleotide binder will depend upon the oligonucleotide employed. When the organic molecule(s) to be removed from the liquid waste solution is known, an oligonucleotide binder can be designed with an oligonucleotide which will specifically and tightly bind that organic molecule(s).

In one preferred embodiment, the targeted oligonucleotide binder is a targeted RNA binder. Targeted RNA binders can be designed as complementary to a known organic molecule in the liquid waste solution.

One specific example of a targeted oligonucleotide binder is an aptamer attached to a solid phase adsorbent particle or a solid phase magnetizable polymer particle as described above. Aptamers are single stranded RNA or DNA oligonucleotides that recognize and bind to specific organic molecules. See, K. O'Rourke, *Clinical Laboratory News* Nov.:1 (1997). Oligonucleotide binders including aptamers attached to a solid phase may be useful for removing organic molecules such as specific proteins from liquid waste solutions.

The oligonucleotide binders may be prepared using the general techniques known in the art for attaching an oligonucleotide to a solid support. Examples of such techniques include Elwood et al., (1986) supra.

B. Methods Of Contacting Liquid Waste To Binder

The methods of the present invention include contacting the solid phase binders described above to the liquid waste solution in order to accomplish the removal of the hazardous organic molecules in the liquid waste solution. In this manner, the liquid waste solution may be treated or clarified. By contacting the solid phase binders to the liquid waste solution, a complex of the solid phase binder and the organic molecules is formed. The hazardous organic molecules become bound to the solid phase binder through physical, physiochemical or immunochemical binding, depending upon the nature of the particular organic molecule and the particular solid phase binder.

The step of contacting the solid phase binder with the liquid waste solution, and particularly the organic molecules contained therein, may be carried out by any suitable means known to those skilled in the art. For example, the solid phase binders may be contacted to the liquid waste solution by washing the liquid waste solution over the solid phase binder. In another embodiment, the solid phase binder is contacted to the liquid waste solution by adding the solid phase binder to or immersing the solid phase binder in the liquid waste solution. If desired, the solid phase binder can be contacted with the liquid waste solution by vaporizing the liquid waste solution and passing the vapor over the solid phase binder.

Figure 1:
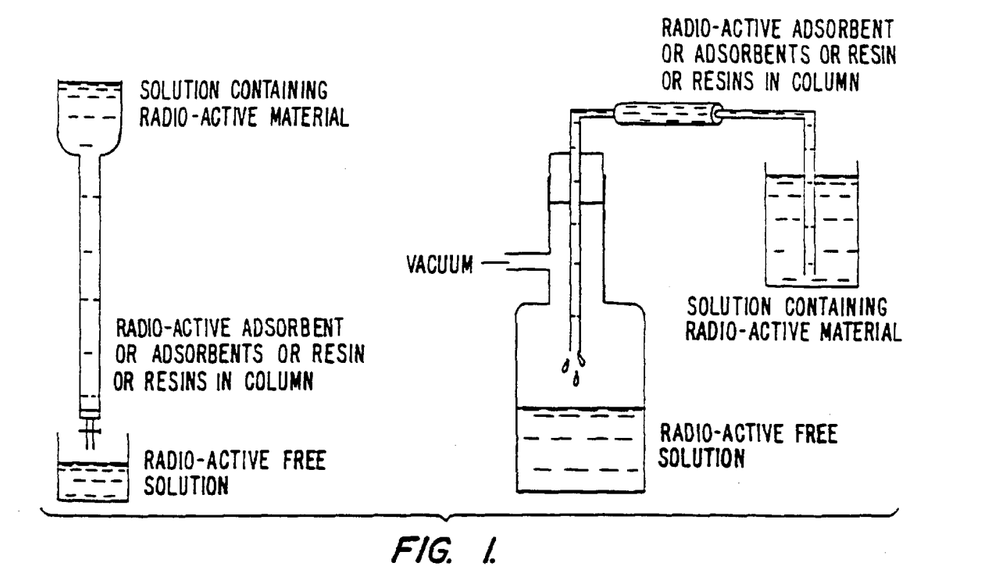
FIG. 1 is an adsorbent column capable of adsorbing a variety of hazardous chemical or biohazardous materials from a solution. A solution containing hazardous materials is passed through a column containing an adsorbent or a mixture of adsorbents by gravity flow or by application of a vacuum.
Figure 2:
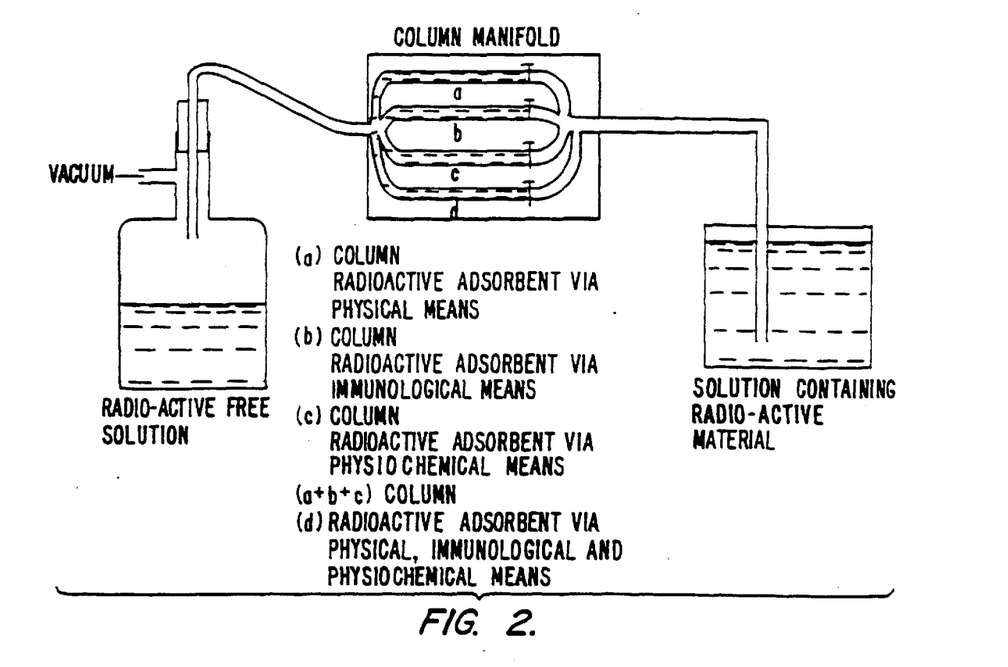
FIG. 2 is a column capable of removing a variety of hazardous chemicals or biohazardous materials from a solution. Four columns, each capable of adsorbing one or several types of hazardous materials from solutions are grouped together in a column manifold. A solution containing the hazardous material is passed through the column manifold by application of a vacuum. Valves located at the front of each column allow the liquid waste solution to pass through one or more of the four columns, depending on the specific type of hazardous chemical or biohazardous molecules present in the hazardous waste solution.
Figure 3:
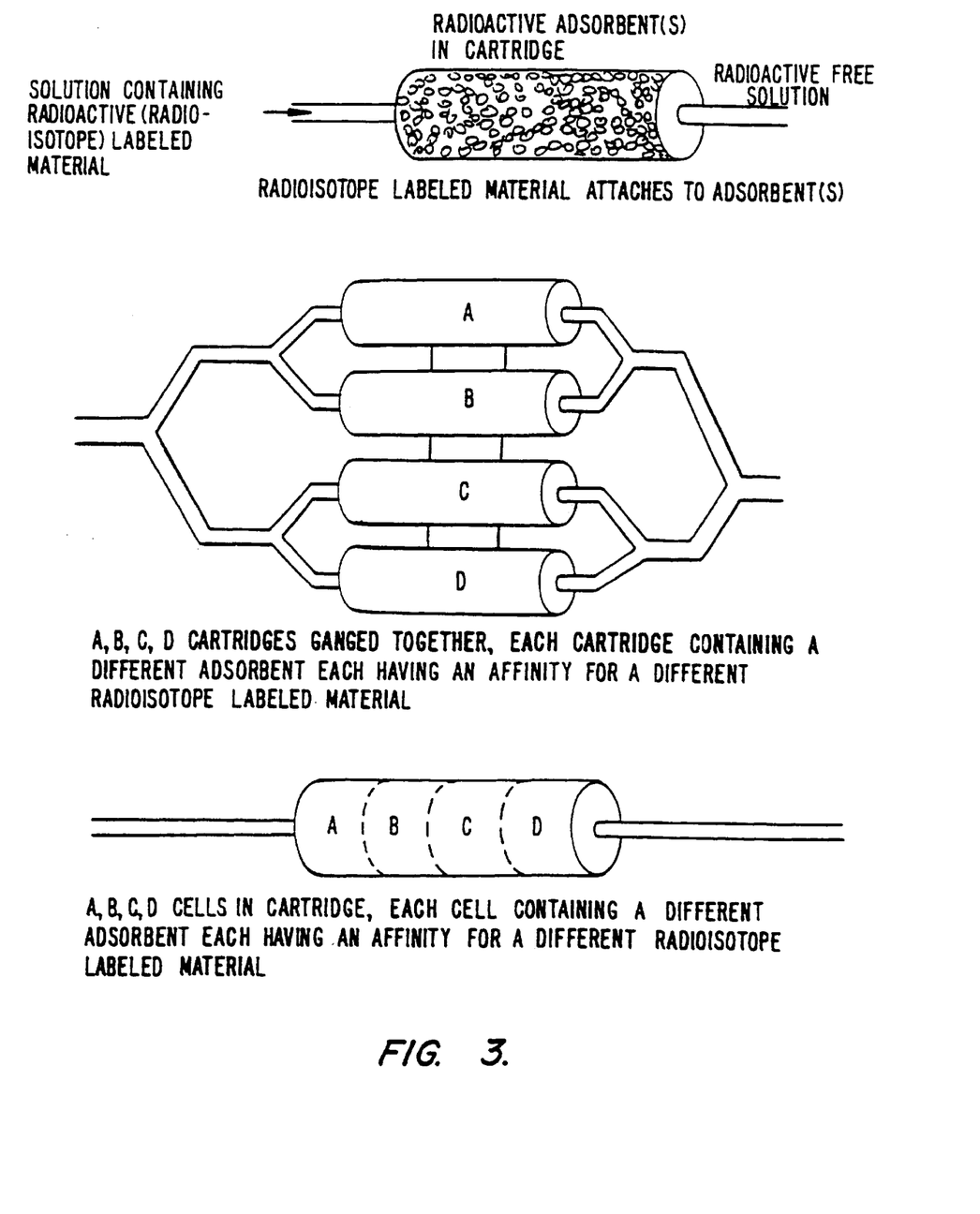
FIG. 3 is a column cartridge capable of removing one or more types of hazardous chemical or biohazardous materials from a solution. A single cartridge can be used in the configuration shown in the top diagrams. Four cartridges are ganged together in a manifold configuration as demonstrated in the middle diagram. In the bottom diagram, four different types of resins with different methods of removing hazardous materials are present in four sequential cells in a single cartridge.

In the embodiments wherein the solid phase binder is contained within a column, the liquid waste solution or gas-phase liquid waste solution can conveniently be passed through the column resulting in removal of the organic molecules. The term "column" as used herein refers not only to conventional columns in which resins or matrices are packed, but also cartridges, devices, holders, and any other type of container in which the solid phase binder may be packed for contacting with the liquid waste solution. In order to facilitate the flow of the liquid waste solution through the column, adsorbent particles can be incorporated into a polymer matrix. The polymer containing the adsorbent particles can then be used in a column by passing the liquid waste solution through the column. In one embodiment of the present invention, charcoal is entrapped within a polymer such as polyacrylamide, and this solid phase binder is packed into a column through which the liquid waste solution can be passed. As an additional example, an adsorbent can be attached to a porous glass support such as porous glass beads. The porous glass beads having the adsorbent thereon are then packed into a column which can be used to remove the organic molecules from the liquid waste solution. In one embodiment of the present invention, charcoal is attached to a porous glass support which is then packed into a column through which the liquid waste solution can be passed. The use of several different column configurations in the present invention are show in FIGS. 1, 2, and 3. These Figures provide examples of only some of the potential column configurations which can be employed for the methods of the present invention. One skilled in the art will readily discern additional suitable column configurations which may be employed, which configurations are contemplated by the present invention. The use of columns as containers for the solid phase binder are advantageous in that the liquid waste solution can be passed through the column, and the organic molecules removed from the liquid waste solution are then contained within the column for convenient storage and disposal.

The step of contacting the liquid waste solution and the solid phase binder will be carried out for a period of time which will depend upon the particular solid phase binder used and the nature of the organic molecules to be removed from the liquid waste solution. In many cases, the organic molecules from a liquid waste solution can be readily complexed with the solid phase binder so that merely passing the liquid waste solution over the solid phase binder (or through a column containing the solid phase binder) at a flow rate sufficient to provide a contact time ranging from a few seconds to several hours, will be sufficient to achieve the formation of the solid phase binder:organic molecule complex. In other cases, it may be desirable to contact the liquid waste solution with the solid phase binder for longer periods of time. More sustained contact of the liquid waste solution and the solid phase binder can be achieved by, for example, adding the solid phase binder to the liquid waste solution or immersing the solid phase binder in the liquid phase solution. In some cases the formation of the solid phase binder:organic molecule complex can be accelerated by stirring a mixture of the solid phase binder and the liquid waste solution. In other embodiments, it may be desirable to incubate the mixture of the solid phase binder and the liquid waste solution for a period of time of from a few seconds to many hours.

For certain liquid waste solution, such as solutions containing two or more different organic molecules, it may be advantageous to combine two or more different solid phase binders for the removal of the organic molecules. Two or more different solid phase binders may be combined for the step of contacting with the liquid waste solution so that only a single contacting step is required to remove different types of organic molecules. The solid phase binders of the present invention are all useful for extracting any of the organic molecules described above from liquid waste solutions. However, some binders will be preferred over others for the treatment of a particular waste solution containing particular types of organic molecules because of efficiency or cost advantages. That is, although any of the solid phase binders described above will remove the organic molecules from the liquid waste solution, for any given liquid waste solution, one or more solid phase binders may be more advantageous. Any combination of two or more of the solid phase binders described above may be employed in the methods of the present invention provided that each individual binder does not affect the efficacy of the other with respect to the removal of the organic molecules.

Depending upon the nature of the liquid waste solution and the nature and number of different organic molecules contained therein, the methods of the present invention may involve repeating the step of contacting the liquid waste solution with solid phase binder two or more times. The solid phase binders employed in each contacting step may or may not be the same. For example, a liquid waste solution containing an MTBE and an antigen may be contacted first with a solid phase binder comprising and adsorbent particle entrapped in or attached to a polymer or matrix and second with an immunochemical binder.

In some commercial embodiments, it may be desirable to couple different solid phase binders in a single continuous process for removing organic molecules from large quantities of liquid waste. For example liquid waste solutions containing hazardous organic chemicals, which are produced in processes of oil refining can be treated by a continuous system in which the liquid waste solution is passed through a column containing one or more solid phase binders. The treated solution could then be recycled or further purified. Alternatively, the liquid waste solution could be continuously passed using through a first column containing one solid phase binder, and next through a second column containing a second solid phase binder. Any number of columns or solid phase binders as are desired may be coupled together in either a bulk or continuous treatment method.

C. Methods Of Removing the Complex From the Liquid Waste

Once the solid phase binder:organic molecule complex is formed by the contacting methods described above, the solid phase complex can be separated from the bulk of the treated liquid waste solution, thereby removing the hazardous organic molecules from the bulk of the solution and concentrating the hazardous organic molecules to facilitate storage and disposal. The term "treated liquid waste solution" as used herein refers to the liquid waste solution after the formation of the solid phase binder:organic molecule complex both before and after the complex is separated from the liquid solution. Thus, in the treated liquid waste solution, the organic molecules contained therein are either bound to the solid phase binder or removed from the solution by the removal of the solid phase binder:organic molecule complex.

Typically, any conventional means of physically separating solid particles from a liquid phase which are known to those skilled in the art may be employed to separate the solid phase binder:organic molecule complex from the treated liquid waste solution. Examples of suitable means of physically separating the complex from the treated liquid waste solution include but are not limited to filtration, including gravity filtration and vacuum filtration, decantation, and centrifugation. The solid phase binder:organic molecule complex can be separated from the treated liquid waste solution using gravity filtration by passing the mixture of the waste solution containing the solid phase complex over a filter and using gravity to pull the treated liquid waste solution through the filter while the solid phase complex particles become trapped by the filter. The solid phase binder:organic molecule complex can be separated from the treated liquid waste solution using vacuum filtration by passing the mixture of the treated liquid waste solution containing the solid phase complex over a filter and applying a vacuum to draw or pull the treated liquid waste solution through the filter while the solid phase complex particles become trapped by the filter. The solid phase binder:organic molecule complex can be separated from the treated liquid waste solution using decantation by allowing the solid phase complex to settle to the bottom of the container of treated liquid waste solution and decanting or pouring the treated liquid waste solution off of the settled complex particles. The solid phase binder:organic molecule complex can be separated from the treated liquid waste solution using centrifugation by centrifuging a mixture of the solid phase complex and the treated liquid waste solution to force the solid phase complex particles to the bottom and permit the treated liquid waste solution to be poured off.

Separation can also be achieved by magnetizable separation, if the solid phase binder has magnetic or magnetizable properties. In those embodiments wherein a magnetized particle binder (including a magnetizable particle immunochemical binder) is employed, the magnetized particle binder:organic molecule complex may be separated from the treated liquid waste solution by application of a magnetic field. A magnetic field can be applied to the mixture of magnetic particle binder:organic molecule complex and treated liquid waste solution by exposing the mixture to a magnet of sufficient strength to attract the magnetizable particle binder:organic molecule complex.

In addition, any of the separation techniques used in immunoassays and those shown in Table 1 above can be used to remove hazardous organic chemicals or biological agents from liquid waste solutions. Other physical separation techniques commonly known to those skilled in the art can also be employed.

By separation of the solid phase binder:organic molecule complex from the treated liquid waste solution, the organic molecules contained in the liquid waste solution prior to contacting with the solid phase binder are removed. The complex separated from the treated liquid waste solution provides a concentrated form of the hazardous organic molecules previously contained in the liquid waste solution. The concentration of the hazardous organic molecules facilitates the storage and disposal of the hazardous organic molecules in part by reducing the quantity of waste to be stored or disposed. A reduction in the quantity of hazardous organic molecule waste advantageously reduces the cost of storing or disposing the hazardous waste.

Depending upon the use intended for the treated liquid waste solution, it may be recycled after removal of the solid phase binder:organic molecule complex or further purified. Further purification may not be required if the treated liquid waste solution is to be recycled in the manufacturing processes or released to the environment, but may be desirable if the treated liquid waste is intended for human consumption. Processes for further purifying the treated liquid waste solution in those embodiments wherein further purification is desired, are already known in the art.

The following examples are provided to illustrate the present invention, and should not be construed as limiting thereof. In these examples, "M" means molar, "nmol" means nanomolar, "L" means liters, "ml" means milliliters, "$\mu l$" means microliters, "°C." means degrees Centigrade. All percentages are in percent by weight unless otherwise indicated.

EXAMPLE 1

Removal of Fluorescein from a Waste Stream by Using Anti-Fluorescein Conjugated to Solid-Phase Particles A 3 ml column was made containing anti-fluorescein conjugated to cyanogen bromide (CNBR) activated Sepharose 6B. One hundred milliliter of a solution containing 500 nmol/L of fluorescein was passed through the column. The optical density of the fluorescein solution was measured before and after it was passed through the column. One-hundred-percent (100%) of the fluorescein in the solution was found to be adsorbed by the affinity column.

EXAMPLE 2

Removal of Fluorescein from a Waste Stream Using an Anti-Fluorescein-Sepharose 6B Column (Example 1) Following Regeneration of the Column The antibody activity of Sepharose 6B column from Example 1 was regenerated by using 20 ml of 0.1 M Glycine buffer pH=2. A 2 liter solution of 12 nmol/L of fluorescein was made; the fluorescein signal of this solution was 272 units. The entire fluorescein solution was passed through the regenerated anti-fluorescein-Sepharose 6B column. The fluorescein intensity of the solution after passing it through the column was 2.1 units, indicating that>99% of the fluorescein was removed from the regenerated column.

EXAMPLE 3

Removal of Fluoroscein from a Liquid Solutions (Waste Stream) Using a Solid-Phase Charcoal Binder A 4 liter solution of 12 nmol/L of fluorescein was made. The fluorescein signal of this solution was 272 units, as determined by a fluorescence spectrometer. One gram of magnetizable charcoal (Magacharc™, Cortex Biochem, Inc., San Leandro, Calif., U.S.A.) was added to the solution. The 4 liter solution was mixed for 30 minutes using an end-over-end mixture. The magnetizable charcoal was separated using a magnet. The fluorescence intensity of the remaining fluorescein left in the solution was 1, indicating that>99% of the fluorescein was adsorbed by the magnetizable charcoal.

EXAMPLE 4

Removal of MTBE from a Liquid Solution (Waste Stream) Using a Solid-Phase Charcoal Binder Using a pipette, add to an aqueous solution of 1.14 mMol (10 ml, one part in 10,000) in a 15 ml screw cap test tube, 5 mg (100 μl) of the magnetizable charcoal polyacrylamide particles (Magacharc™, Cortex Biochem, Inc., San Leandro, Calif., U.S.A.). The aqueous solution containing magnetizable charcoal polyacrylamide particles is then mixed well for 2 minutes and the magnetizable particles are then sedimented by using a magnetic field. Alternatively, the magnetizable particles may be sedimented using a centrifuge at 1000 rpm for 2 minutes. Greater than 99% of MTBE is then adsorbed by the magnetizable charcoal polyacrylamide particles.

EXAMPLE 5

Removal of MTBE From a Liquid Solution Using Magnetizable Particles Immunochemical Binder 50 mg of MTBE mouse monoclonal antibody chemically coupled to magnetizable cellulose particles (MagaCell™, Cortex Biochem, Inc., San Leandro, Calif., U.S.A.) is added to the solution in a polystyrene plastic tube containing 10 ml of 1.14 μmol/l (one part per million MTBE). Following a brief incubation (15 minutes), while mixing at room temperature, the antibody: MTBE complex is then separated on a magnet or alternatively, by a brief centrifugation step.

EXAMPLE 6

The Use of Natural Binders for Removal of Endotoxin Material from Waste Streams Polymyxin B, a cyclic lipophilic peptide antibiotic produced by Bacillus Polymyxa, is known to neutralize the biological activity of endotoxins presumably due to its binding with high affinity to the lipid A moiety. The high binding affinity of polymyxin B sulfate for the lipid A moiety of most endotoxins can be exploited by conjugating polymyxin B to magnetizable particles and then using them for scavenging endotoxins from waste streams.

The foregoing is illustrative of the present invention and is not to be construed as limiting thereof. The invention is defined by the following claims, with equivalents of the claims to be included therein.

What is claimed is:

1. A method for removing organic molecules selected from the group consisting of organic chemical molecules and biological agents, from a liquid waste solution, said method comprising the steps of:
   a) contacting said liquid waste solution with a solid phase binder comprising a magnetizable particle binder to form a magnetizable particle binder:organic molecule complex; and
   b) separating said complex from said liquid waste solution to remove the organic molecules from the liquid waste solution;
   wherein said magnetizable particle binder comprises at least one adsorbent particle selected from the group consisting of silicates, talc, Fuller's earth, glass wool, charcoal, activated charcoal, and celite.

2. The method according to claim 1, wherein said magnetizable particle binder is selected from the group consisting of binders comprising magnetizable particles entrapped in a matrix and binders comprising solid phase adsorbent particles entrapped in magnetizable polymer.

3. The method according to claim 1, wherein said magnetizable particle binder comprises a magnetizable particle entrapped in a matrix wherein said magnetizable particle is iron oxide, and said matrix is selected from the group consisting of glass, latex, agarose, nylon, polystyrene, polyacrylamide, polyacrolein, cellulose and copolymers thereof.

4. A method for removing organic molecules selected from the group consisting of organic chemical molecules and biological agents, from a liquid waste solution, said method comprising the steps of:
   a) contacting said liquid waste solution with a solid phase binder comprising a magnetizable particle binder to form a magnetizable particle binder:organic molecule complex; and
   b) separating said complex from said liquid waste solution to remove the organic molecules from the liquid waste solution;
   wherein said magnetizable particle binder comprises an adsorbent particle entrapped in a magnetizable polymer wherein said adsorbent particle is selected from the group consisting of talc, glass wool, Fuller's earth, charcoal, and activated charcoal, and said magnetizable polymer is selected from the group consisting of magnetizable polyacrylamide gel, magnetizable polyacrolein gel, and magnetizable cellulose.

5. The method according to claim 1, wherein more than one organic molecule is present in the liquid waste solution.

6. A method for removing organic molecules selected from the group consisting of organic chemical molecules and biological agents, from a liquid waste solution, said method comprising the steps of:
   a) contacting said liquid waste solution with a solid phase binder comprising a magnetizable particle binder to form a magnetizable particle binder:organic molecule complex; and
   b) separating said complex from said liquid waste solution to remove the organic molecules from the liquid waste solution;
   wherein said organic molecule is MTBE.

7. A method for removing organic molecules selected from the group consisting of organic chemical molecules and biological agents, from a liquid waste solution, said method comprising the steps of:
   a) contacting said liquid waste solution with a solid phase binder comprising a magnetizable particle binder to form a magnetizable particle binder:organic molecule complex; and
   b) separating said complex from said liquid waste solution to remove the organic molecules from the liquid waste solution;
   wherein said organic molecule is a viral or bacterial agent.

* * * * *